United States Patent [19]
Arens

[11] 3,988,193

[45] Oct. 26, 1976

[54] TAPING ATTACHMENT OR DEVICE

[76] Inventor: Cornelis G. Arens, 700 Haggerty Highway, West Bloomfield, Mich. 48033

[22] Filed: Aug. 29, 1974

[21] Appl. No.: 501,648

Related U.S. Application Data

[63] Continuation-in-part of Ser. No. 316,987, Dec. 20, 1972, Pat. No. 3,832,876.

[52] U.S. Cl. ............................. 156/446; 156/486; 156/522; 156/530; 156/538; 156/580
[51] Int. Cl.² ........................................... B65C 9/18
[58] Field of Search .......... 156/443, 475, 522, 530, 156/543, 580, 541, 191, 446, 486, 538, 522

[56] References Cited
UNITED STATES PATENTS

| | | | |
|---|---|---|---|
| 2,652,166 | 9/1953 | Johnson | 156/522 |
| 2,756,891 | 7/1956 | Hill | 156/522 |
| 2,818,908 | 1/1958 | Byrnes et al. | 156/522 |
| 3,128,218 | 4/1964 | McGraw, Jr. | 156/522 |
| 3,427,214 | 2/1969 | Voigt | 156/541 |
| 3,582,433 | 6/1971 | Rothenberger | 156/530 |
| 3,813,275 | 5/1974 | Weick et al. | 156/543 |
| 3,832,876 | 9/1974 | Arens | 72/12 |
| 3,901,757 | 8/1975 | Eglinton | 156/446 |

*Primary Examiner*—Douglas J. Drummond
*Assistant Examiner*—Basil J. Lewris
*Attorney, Agent, or Firm*—Willis Bugbee

[57] ABSTRACT

This taping attachment or device applies a ribbon or adhesive-coated tape to an article moving relatively thereto, such as around a coil of strip material being wound upon a rotating mandrel, in order to prevent subsequent unwinding of the coil. This taping attachment or device consists of a tape roll holder mounted above the carrier for the article to be taped, such as a mandrel, adjacent a reciprocatory fluid pressure motor. The latter includes a piston rod having mounted on its lower end a pivoted tape applicator with a tape cutter thereon urged or positively driven in a downward tape-severing direction.

3 Claims, 5 Drawing Figures

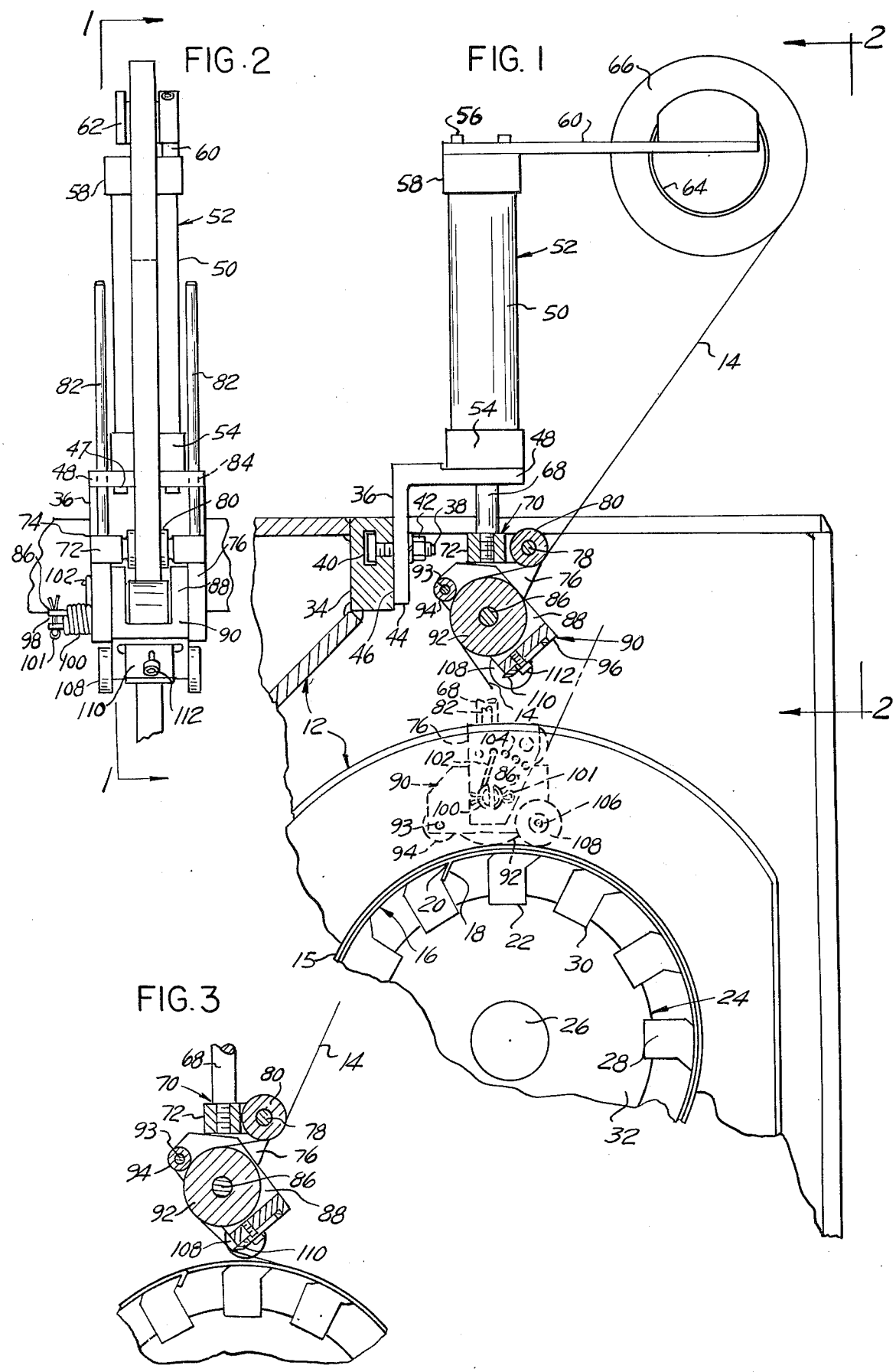

TAPING ATTACHMENT OR DEVICE

This is a continuation-in-part of my co-pending application Ser. No. 316,987, filed Dec. 20, 1972 for Strip Material Coiling Machine, to be issued on Sept. 3, 1974 as U.S. Pat. No. 3,832,876, and is an improvement upon the coil-taping unit thereof.

Summary of the Invention

The principal form of the taping attachment or device of the present invention has an adhesive roll holder stationarily mounted above a vertically movable taped applicator having a tape guide roller and a tape cutter tiltably mounted on the piston rod of a fluid pressure cylinder. This assembly is mounted above a holder for the article to be taped, means being provided for moving the taping device and the holder relatively to one another while taping is being performed. In a modification of the present invention, the adhesive tape roll holder is mounted upon and moves vertically with the tape applicator. When the tape has been applied to the strip material coil on the mandrel and the tape applicator is raised, the tape roll is prevented from rotating by a braking device, thereby causing the thus-taut tape to be severed by a knife attached to the tape applicator.

In the drawings,

FIG. 1 is a side elevation, partly in section along the line 1—1 in FIG. 2, of a coil taping attachment or device shown as mounted above the mandrel of a strip material coiling machine, showing the tape-applying and cut-off device in solid lines in its raised position and in dot-dash lines in its lowered position engaging the tape wound on the strip material coil on the coiling mandrel;

FIG. 2 is a front elevation in the direction of the arrows 2—2 in FIG. 1, with the coiling mandrel omitted;

FIG. 3 is a fragmentary side elevation, partly in section as in FIG. 2, showing the tilted position of the tape-applying and cut-off device immediately prior to cut-off of the tape after winding upon the coil of strip material on the coiling mandrel;

Figure 4:
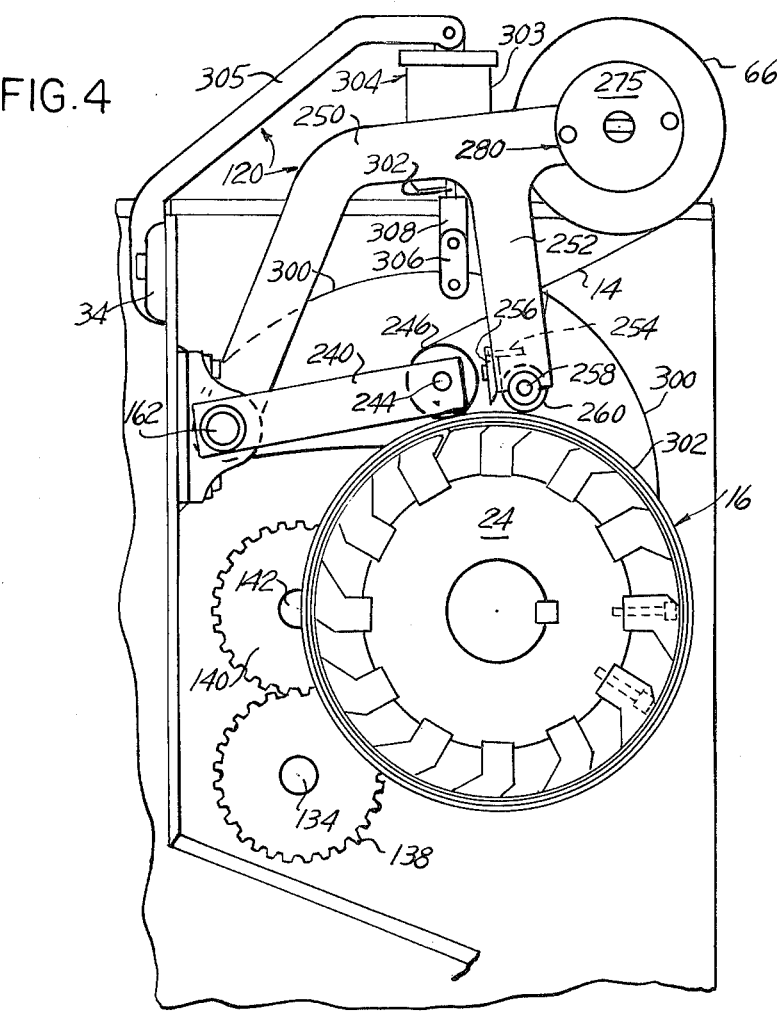
FIG. 4 is a side elevation of a modified coil taping attachment for a strip material coiling machine, showing the tape-applying and cut-off device lowered into its tape-applying position.

Referring to the drawings in detail, FIGS. 1 and 2 show a taping attachment or device 10, shown, for example, as mounted at the outlet end of a strip material coiling maching 12, to apply an adhesive tape 14 to an article, such as a sheet material strip 15 wound up in a strip material coil 16 wherein the V-shaped leading end 18 thereof has been hooked onto the wedge-shaped forward edge 20 of one of the circumferentially spaced multiple catch bars 22 of a strip material coiling mandrel or article carrier 24 mounted upon a rotatable shaft 26. The base portions 28 of the bars 22 are seated in circumferentially-spaced parallel grooves 30 which extend lengthwise of a drum 32. The shaft 26 is mounted and driven as fully described in my above-mentioned co-pending U.S. Pat. No. 3,832,876 dated Sept. 3, 1974, and is beyond the scope of the present invention.

Adapted to be mounted on the horizontal end frame member 34 of the strip material coiling machine 12 is an angle bracket 36, the vertical flange of which is bored to receive a pair of bolts 38, only one of which is shown in FIG. 1. The horizontal frame end member 34 is provided with a horizontal tee-slot 40 which receives the heads and shanks of the bolts 38, the nuts 42 of which securely clamp the vertical flange 44 of the angle bracket 36 against the front face 46 of the frame end member 34.

Bolted as at 47 (FIG. 2) to the horizontal flange 48 of the angle bracket 36 is the cylinder 50 of a reciprocatory fluid pressure motor, generally designated 52, the lower cylinder head 54 of which rests upon the horizontal flange 48 of the angle bracket 36. Bolted as at 56 to the upper cylinder head 58 of the cylinder 50 is an arm 60 extending horizontally and carrying on its outer end a double-headed pintle 62 which extends through and rotatably supports annular core 64 of a roll 66 of the adhesive tape 14 to be applied to the strip material coil 16 on the drum 24.

Reciprocably mounted in the cylinder 50 of the reciprocatory motor 52 is a piston 68, to the reduced-diameter threaded lower end of which is secured a tape applicator carriage 70, including a correspondingly bored and threaded bridge portion 72 of a yoke 74 having depending spaced parallel side plates 76. Mounted on an axle 78 supported by the parallel plates 76 of the yoke 74 is a loosely-rotatable upper tape guide roller 80. The bridge portion 72 is also drilled and threaded at laterally spaced locations to receive the correspondingly threaded lower ends of spaced parallel guide rods 82 (FIG. 2) which slidably engage correspondingly-located parallel guide bores 84 in the upper horizontal flange 48 of the angle bracket 36.

The depending parallel plates 76 of the yoke 74 are drilled in alignment horizontally to pivotally support an axle 86 to which are keyed the correspondingly drilled side arms 88 of a U-shaped hanger or cutter holder 90. Loosely and rotatably mounted on the axle 86 between the side arms 88 is a tapeapplying roller 92. Extending between the side arms 88 near the lower rearward corners thereof is an axle 93 upon which an intermediate tape guide roller 94 is loosely and rotatably mounted so as to press against the opposite side of the tape 14 from the lower guide roller 92. The side arms 88 are joined to one another by a bridge portion 96. The axle 86 at its left-hand end (FIG. 2) extends outward beyond the depending side plates 76 and at its end is slotted as at 98 to receive the diametrically bent outer end of a torsion spring 100 retained by a cotter pin 101 inserted in the radially drilled outer end portion of the axle 86. The elongated inner end 102 of the spring 100 is perpendicularly bent to enter one of a series of holes 104 (FIG. 1) in the adjacent side plate 76 for the purpose of enabling the adjustment of the torsion applied to the axle 86 and consequently to the U-shaped hanger 90 which is keyed or otherwise drivingly secured to the side arms 88 thereof.

The forward corners of the U-shaped hanger 90 are drilled to receive pivot studs or bolts 106 upon which forward contact wheels 108 are rotatably mounted. Thus, the torsion spring 100 constantly tends to tilt the U-shaped hanger 90 and its associated parts in a downward and forward clockwise direction (FIG. 1). The bridge portion 96 is recessed on its forward face to slidably and adjustably receive a cutter blade 110 which is slotted centrally for the passage of a clamping screw 112 by which the cutter blade 110 is held in its adjusted position. The bridge portion 96 is drilled and threaded for the reception of the correspondingly drilled and threaded shank of the clamping screw 112.

In the operation of the invention, let it be assumed that strip sheet material has been fed past a measuring device and an intermittently operated cut-off and bending device which bends the end 18 and cuts off a specified length of strip and feeds it to the mandrel 24 where the bent end 18 is held down by the arcuate pressure arm 300 operated by the fluid pressure cylinder 304 (FIG. 4) until it is intercepted and engaged by the wedge-shaped edge 20 of one of the catch bars 22 of the strip coiling mandrel 24, as set forth in my above-mentioned co-pending patent to be issued Sept. 3, 1974, under U.S. Pat. No. 3,832,876. Let it also be assumed that the mandrel 24 has then been rotated by its shaft 26 a sufficient number of revolutions to wind up the measured length of strip 15 into the coil 16 thereof so that the latter is ready for the application of the adhesive tape 14 by the coil taping attachment 10 of the present invention.

Meanwhile, the adhesive tape 14 has been trained from the tape roll 66 downward beneath the upper guide roller 80 and between the tape applying roller 92 and the intermediate guide roller 94, and has been cut off manually on the cutter blade 110 and hangs free. The reciprocatory fluid pressure motor 52 is now operated to move the piston 68 downward, thereby causing the carriage 70 to move downward so as to unwind tape 14 from the roll 66 thereof while the tape 14 is yieldingly held between the rollers 92 and 94. This action moves the roller 92 to move downward to its horizontal lower position of FIG. 1 and press the free end of tape 14 against the outermost layer of the core 16 so as to adhere thereto. The mandrel 24 is then rotated to cause the tape 14 to be wound around the strip material coil 16 while the carriage 70 is still in its lowered line position (FIG. 1).

The reciprocatory fluid pressure motor 52 is now operated to cause the piston 68 and tape applicator carriage 70 to rise, as a result of which the torsion spring 100 causes the axle 86 and the U-shaped hanger 90 to rotate in a clockwise direction from the approximately horizontal position shown in the dash-dot lines in the lower portion of FIG. 1 into its tilted position shown in FIG. 3. This action causes the knife 110 to swing into engagement with the now taut tape 14 and sever it from the remainder thereof extending upward to the tape roll 66. In the meantime, the lower guide roller 92 has pressed the adhesive tape 14 firmly into engagement with the strip material coil 16 on the mandrel 24 so as to prevent unwinding of the coil 16.

Pressure fluid is now admitted to the lower cylinder head 54 and exhausted from the upper cylinder head 58 of the reciprocatory fluid pressure motor 52, causing the carriage 70 to rise, whereupon the torsion spring 100 again tilts the U-shaped hanger 90 back into its inclined position. The coil 16 of strip material, thus taped by the adhesive tape 14, is now ejected from the mandrel 24 by an axially-movable ejector ring (not shown) coaxial with the shaft 26.

Figure 5:
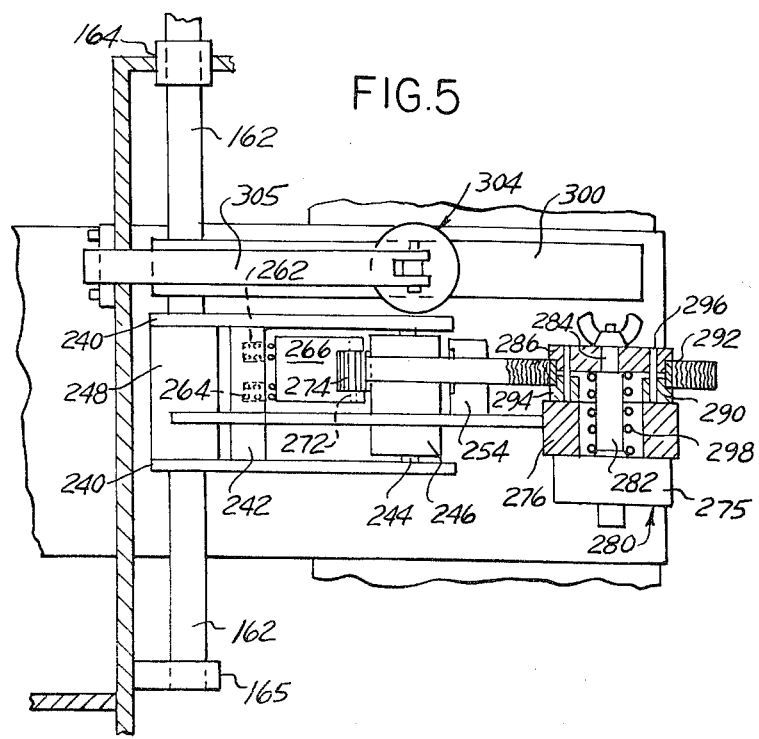
FIG. 5 is a top plan view, partly in horizontal section through the tape roll holder.

The modified coil taping unit or attachment 120 shown in FIGS. 4 and 5 was originally disclosed and claimed in my above-mentioned copending U.S. Pat. No. 3,832,876, but the claims thereon were divided out in response to a restriction requirement. The modified coil taping unit or attachment 120 (FIGS. 4 and 5) is mounted upon a shaft 162, which is journaled in bearing brackets 165 and 164 respectively and, as shown in my said copending U.S. Pat. No. 3,832,876, is rotated by a reciprocatory fluid pressure motor (not shown) to swing the taping unit 120 into and out of proximity to the strip material coil 16 when it has been completely wound upon the coiling mandrel 24. Keyed or otherwise fixedly secured to the shaft 162 are two axially-spaced parallel arms 240, these arms 240 being interconnected by a crossbar 242 welded or otherwise secured thereto. Journaled in the free ends of the arms 240 is the axle 244 of a tape guide roller 246 over and around which the coil-securing tape 14 is passed (FIG. 4).

Loosely and rotatably mounted on the shaft 162 between the arms 242 is a sleeve or hub 248. Welded or otherwise secured to the hub 248 on the top thereof between the two parallel arms 240 is a bent arm 250, the upper forward end portion of which has a transverse arm extension 252 extending downward therefrom with its lower end disposed approximately in line with the axle 244 in its lowered position. Mounted on the lower end of the downwardly extending arm 252 is a bracket 254 on which is mounted a tape-cut-off knife 256. Also mounted on the lower end of the arm 252 is the axle 258 of a pressure roller 260 adapted to engage the tape 14 and the coil 16 as it is being wound on the coiling mandrel 24.

Formed in the forward side of the cross bar 242 (FIG. 5) are two laterally-spaced parallel sockets 262 in which are seated the rearward ends of two compression springs 264, the forward ends of which engage and urge forwardly a slide block 266, while the slide block 266 is guided in any suitable way, as by guide rods within the springs 264. Rotatably mounted upon an axle 272 in the notched-out forward end of the slide block 266 is a longitudinally-ribbed pressure roller 274 which serves to press the tape 14 against the tape guide roller 246.

Welded or otherwise secured to the upper forward end of the bent arm 250 is a hollow cylindrical boss or block 276 with a bore 278 therethrough. Bolted or otherwise secured to the outer side of the boss 276 is the cylinder 275 of a reciprocatory fluid pressure motor 280 actuated by pressure fluid, such as compressed air, to advance or retract a plunger 282, the piston head of which (not shown) is reciprocable within the cylinder 280. Centrally bored to receive the reduced-diameter threaded outer end portion 284 of the plunger 282 is a movable disc-shaped tape roll holder 286 held in place by a wing-nut 288. A fixed roll holder 290 is ring shaped and mounted on the boss 276. Both are peripherally grooved at 292 to receive the annular core or mounting sleeve 294 of the tape roll R and both are drilled in spaced parallel relationship to receive spaced parallel guide rods 296, the inner ends of which are seated in the boss or block 276. A compression coil spring 298 urges the movable tape roll holder 286 away from the fixed tape roll holder 290 on the inner side of the block or boss 276, whereas the fluid pressure motor 280, when actuated, causes its plunger 284 to pull the movable tape holder 286 into braking engagement with the tape roll R against the fixed tape holder 290, thereby resisting the unrolling of the tape T from the tape roll R mounted upon the peripherally grooved tape roll holders 286 and 290.

A crescent-shaped pressure arm 300 is loosely and swingably mounted at its rearward end upon the shaft 162 (FIG. 4) and has an arcuate lower surface 302 of approximately the same average curvature as the wound-up coil 16 so as to bear downward against the coil 16 and guide the strip material 15 onto the catch bars 22 during coiling. The arm 300 is raised and lowered by the piston rod 302 of the cylinder 303 of a reciprocatory fluid pressure motor 304 pivotally mounted on an arm 305 bolted to the frame structure 34, through the pivotal connection formed by the intermediate links 306 pivoted to the arm 300 and to the piston rod clevis 308.

In the operation of the modified coil taping attachment or unit 120 of FIGS. 4 and 5, when the strip 15 of sheet material has been wound up into the coil 16 upon the mandrel 24, the latter's rotation is halted by the halting of its driving and driven gears 138 and 140 upon their respective shafts 134 and 142, as explained in my above-mentioned co-pending U.S. Pat. No. 3,832,876. A valve (not shown) controlling the admission and discharge of pressure fluid to the cylinder 275 of the reciprocatory fluid pressure motor 280 is now actuated (FIGS. 4 and 5) to move the piston rod 282 and movable tape roll holder 286 outward, thereby releasing the braking action of the latter upon the mounting sleeve or annular core 294 of the tape roll R for free rotation.

At the same time, the actuation of the above-mentioned fluid pressure motor (not shown) causes clockwise rotation of the shaft 162, which in turn swings the taping unit 20 downward in a clockwise direction into the position shown in FIG. 4 as a result of the downward swinging of the arms 240 keyed to the shaft 162.

The coiling drum mandrel 24 is now again set in rotation, whereupon the tape 15 is wound from the roll 66 and passes downward between the ribbed pressure roller 274 and the tape guide roller 246 onto the periphery of the coil 16, thereby depositing a band of the adhesive tape 14 around the coil 16 to prevent unrolling the latter. In the meantime, the roller 274 (FIG. 5) has been constantly pressing the tape 14 against the guide roller 246 in response to the pressure of the compression springs 264 against the slide block 266 carrying the roller 274.

The above-mentioned reciprocatory fluid pressure motor (not shown) driving the shaft 162 is now reversed, whereupon the consequent counterclockwise rotation of the shaft 162 swings the arms 240 upward in a counterclockwise direction carrying with them the tape guide roller 246. Meanwhile, the supply of pressure fluid to the cylinder 275 of the reciprocatory fluid pressure cylinder 280 has also been reversed by reversing its control valve so as to retract its piston rod 282 (FIG. 5). This action brings the movable tape holder 286 into braking engagement with the annular tape roll core or sleeve 292 against the tape roll holder 290, thereby momentarily preventing rotation of the tape roll 66. At the same time, the upward swinging of the parallel arms 240 (FIGS. 4 and 5) pulls the tape 14 beyond the guide roller 246 upward into a taut position past the lower edge of the tape cut-off knife 256, severing the length of tape 14 from the tape roll 66 which has rounded the guide roller 246 from the band of tape 14 which has just been wound around the coil 17 of strip stock 15 wound on the mandrel 24.

The continued upward swinging movement of the parallel arms 240 by the counterclockwise rotation of the shaft 162 causes the tape guide roller 246 to engage and move upward the bent arm 250 from the lowered position shown in FIG. 4 to a raised position. At this time or earlier, pressure fluid is admitted to the lower end of the cylinder 303 of the reciprocatory fluid pressure motor 304 and discharged from the upper end thereof. This action raises the piston rod 304 (FIG. 6) and the crescent-shaped pressure arm 300 through the intermediate action of the links 306 and clevis 308 out of engagement with the coil 16 of strip stock 15 wound upon the mandrel 24.

With the taping unit 120 raised into its retracted position by the upward swinging of the parallel arms 240, the coil 16 of strip material 15 is now ready for ejection from the mandrel 24, as mentioned above.

It will be evident to those skilled in this art that various other modifications may be made within the scope of this invention. Thus the fluid pressure motor 52 may be mounted in other than the vertical position shown in FIGS. 1 and 2 because the torsion spring 102 is still operable in such other positions. Furthermore, the taping attachment or device has been so named because it is not only operable as an attachment to another machine, such as the coiling machine 12 in connection with which it has been described, but may also be operated independently for taping articles other than the coils 16 - for example, applying tapes to hold closed the flaps of cartons, with relative motion therebetween produced by moving the cartons on a conveyor or by mounting the device on a carriage which is moved relatively to the cartons or other articles to be taped. It will also be evident that either pneumatic fluid or hydraulic fluid may be employed as the working fluid for the fluid pressure motors 52 (FIG. 1), or 275 and/or 304 (FIGS. 4 and 5).

I claim:

1. A device for applying a band of adhesive tape to an article upon an article carrier wherein the taping device and the article carrier are moved relatively to one another while the device is applying the tape to the article, said device comprising
   - a taping device support adapted to be mounted in proximity to the article carrier,
   - a tape roll holder for an adhesive tape roll mounted on said support remote from the article carrier,
   - a tape applicator carriage movably mounted on said support for travel relatively thereto toward and away from the article carrier,
   - a rearward rotary tape guide roller mounted on and movable with said tape applicator carriage between said tape roll holder and the article carrier,
   - a tape-applying roller rotatably mounted on a shaft on said tape applicator carriage between said rearward tape guide roller and the article carrier,
   - a tape cutter holder pivotally mounted approximately midway between its opposite ends on said shaft coaxial with said tape-applying roller,
   - an intermediate tape pressing roller rotatably mounted on said tape cutter holder between said rearward tape guide roller and said tape-applying roller,
   - a tape cutter mounted on said tape cutter holder in forwardly spaced relationship to the pivotal mounting thereof,
   - means for moving said tape applicator carriage toward and away from the article carrier and sequentially moving said tape-applying roller and said tape cutter into and out of tape-applying and tape-cutting engagement respectively with the tape adhering to the article on the article carrier,
   - and a torsion spring interposed between said carriage and said shaft coaxial with the pivotal mounting of said cutter and urging said cutter holder and said tape cutter thereon toward the article carrier and into cutting engagement with the tape leading to the article thereon.

2. A tape-applying device, according to claim 6, wherein axially-spaced article carrier contact wheels are mounted on said cutter holder at opposite ends of said cutter in straddling laterally-spaced relationship to the tape therebetween and adapted to hold down the article against the article carrier while the tape is being cut off by the cutter between the wheels.

3. A tape-applying device, according to claim 2, wherein the tape cutting portion of said cutter is disposed between the peripheries and centers of said contact wheels.

* * * * *